UNITED STATES PATENT OFFICE.

ERHART SCHLEICHER, OF LUDWIGSHAFEN, GERMANY, ASSIGNOR TO THE BADISCHE ANILIN & SODA FABRIK, OF SAME PLACE.

VIOLET DYE.

SPECIFICATION forming part of Letters Patent No. 671,896, dated April 9, 1901.

Application filed January 3, 1901. Serial No. 41,996. (No specimens.)

*To all whom it may concern:*

Be it known that I, ERHART SCHLEICHER, doctor of philosophy and chemist, a subject of the Duke of Saxe-Meiningen, residing at Ludwigshafen-on-the-Rhine, in the Kingdom of Bavaria, Germany, have invented new and useful Improvements in Violet Dyes, of which the following is a specification.

The coloring-matters hitherto obtained by combining diazotized 1.8 amido-naphthol sulfo-acids with alpha-naphthylamin produce shades which in themselves have little commercial value and require an after-treatment on the fiber with chromates or the like to make them of practical use, the original shades being at the same time completely changed. I have found that by combining diazotized 1.8.5.7 or 1.8.4.7 amido-naphthol-disulfo-acid (that is, a para-sulfonated 1.8 amido-naphthol with also a sulfo group in the position 7) with alpha-naphthylamin a most valuable dyestuff is formed which dyes wool directly a beautiful even violet of excellent fastness to light and alkalies. I would remark that by "1.8.4.7 amido-naphthol-disulfo-acid" I understand that disulfo-acid which can be obtained by treating 1.8.4 amido-naphthol-monosulfo-acid with four and a half (4½) times its weight of weakly-fuming sulfuric acid (containing eight (8) per cent. SO₃) at ordinary temperature and which most probably possesses the above constitution.

My new coloring-matter is in the dry condition a dark powder having a green sheen, soluble in water with a red-violet to violet color, which on addition of carbonate-of-soda solution becomes brown-red and on addition of caustic-soda solution brownish orange. It dissolves in concentrated sulfuric acid with a blue to green-blue color. On reduction, for instance, with zinc-dust in alkaline solution it yields, in addition to 1.4 naphthylene-diamin, the hereinbefore-defined 1.8 amido-naphthol-disulfo-acid, which was employed as initial material. This acid may be recognized by the fact that it yields the same coloring-matter when coupled with diazo-sulfanilic acid in acid solution as when coupled with the same diazo body in alkaline solution, the coloring-matter formed being an ortho-amido-azo body. This latter yields as one of its reduction products a derivative of 1.2 naphthylene-diamin, which is capable of combining with phenanthroquinone to form a phenanthronaphthazin derivative, which dissolves in concentrated sulfuric acid with a violet to blue color.

The following example shows the best means of preparing my new coloring-matter with which I am acquainted; but I do not confine myself to the details therein set forth. The parts are by weight.

Example: Dissolve three hundred and forty-one (341) parts of the mono-sodium salt of 1.8.5.7 or 1.8.4.7 amido-naphthol-disulfo-acid in five thousand (5,000) parts of water by neutralization with fifty-three (53) parts of pure calcined soda. Then add seventy-two (72) parts of sodium nitrite and diazotize in the cold by adding four hundred (400) parts of hydrochloric acid, (containing about thirty (30) per cent. of HCl.) Precipitate the diazo body formed with common salt, collect by filtering, and press it. Stir it up with water and run it while stirring into a thin aqueous paste containing one hundred and fifty (150) parts of finely-divided alpha-naphthylamin. When the formation of coloring-matter is completed, acidify the mixture with hydrochloric acid to remove the excess of alpha-naphthylamin and collect the coloring-matter by filtration after the addition of common salt, if necessary. Dissolve the coloring-matter thus obtained in warm dilute sodium-carbonate solution and precipitate it as sodium salt therefrom by means of common salt. The combination of the diazo body with alpha-naphthylamin can also be carried out in a solution weakly acidified with hydrochloric acid or in acetic-acid solution.

Now what I claim is—

1. The new dyestuff which can be derived from a hereinbefore-defined 1.8 amido-naphthol-disulfo-acid and alpha-naphthylamin, which in the form of its sodium salt is a dark powder soluble in water and which on reduction yields the 1.8 amido-naphthol-disulfo-acid employed as initial material, and 1.4 naphthylene-diamin, all substantially as described.

2. The new dyestuff which can be derived from 1.8.5.7 amido-naphthol-disulfo-acid and alpha-naphthylamin which in the form of its sodium salt is a dark powder soluble in water with a red-violet color, and in concentrated sulfuric acid with a blue color, and which on reduction yields 1.8.5.7 amido-naphthol-disulfo-acid, and 1.4 naphthylene-diamin, all substantially as hereinbefore described.

In testimony whereof I have hereunto set my hand in the presence of two subscribing witnesses.

ERHART SCHLEICHER.

Witnesses:
JOHN L. HEINKE,
JACOB ADRIAN.